United States Patent [19]

Bjorklund

[11] 4,062,480
[45] Dec. 13, 1977

[54] VALVE WITH DRAW BACK AFTER CLOSING

[76] Inventor: Curt Arnold Bjorklund, Box 99, Ulricehamn, Sweden

[21] Appl. No.: 675,097

[22] Filed: Mar. 15, 1975

Related U.S. Application Data

[62] Division of Ser. No. 334,559, Feb. 22, 1973, Pat. No. 3,886,974.

[30] Foreign Application Priority Data

Mar. 3, 1972 Austria .................................. 1826/72
Nov. 27, 1972 Sweden .............................. 15402/72

[51] Int. Cl.² ............................................. B67D 5/04
[52] U.S. Cl. .................................... 222/571; 141/119
[58] Field of Search ............... 141/116, 117, 119, 120; 222/571

[56] References Cited

U.S. PATENT DOCUMENTS 2,492,873 12/1949 Lamb ..................................... 141/117
3,416,577 12/1968 Franz ..................................... 141/117

Primary Examiner—Stanley H. Tollberg
Assistant Examiner—Hadd Lane
Attorney, Agent, or Firm—Fred Philpitt

[57] ABSTRACT

A valve arrangement constructed so that it will draw back a limited amount of fluid from the outlet of the fluid dispenser when the valve is changed from the flow to the no-flow condition.

6 Claims, 16 Drawing Figures

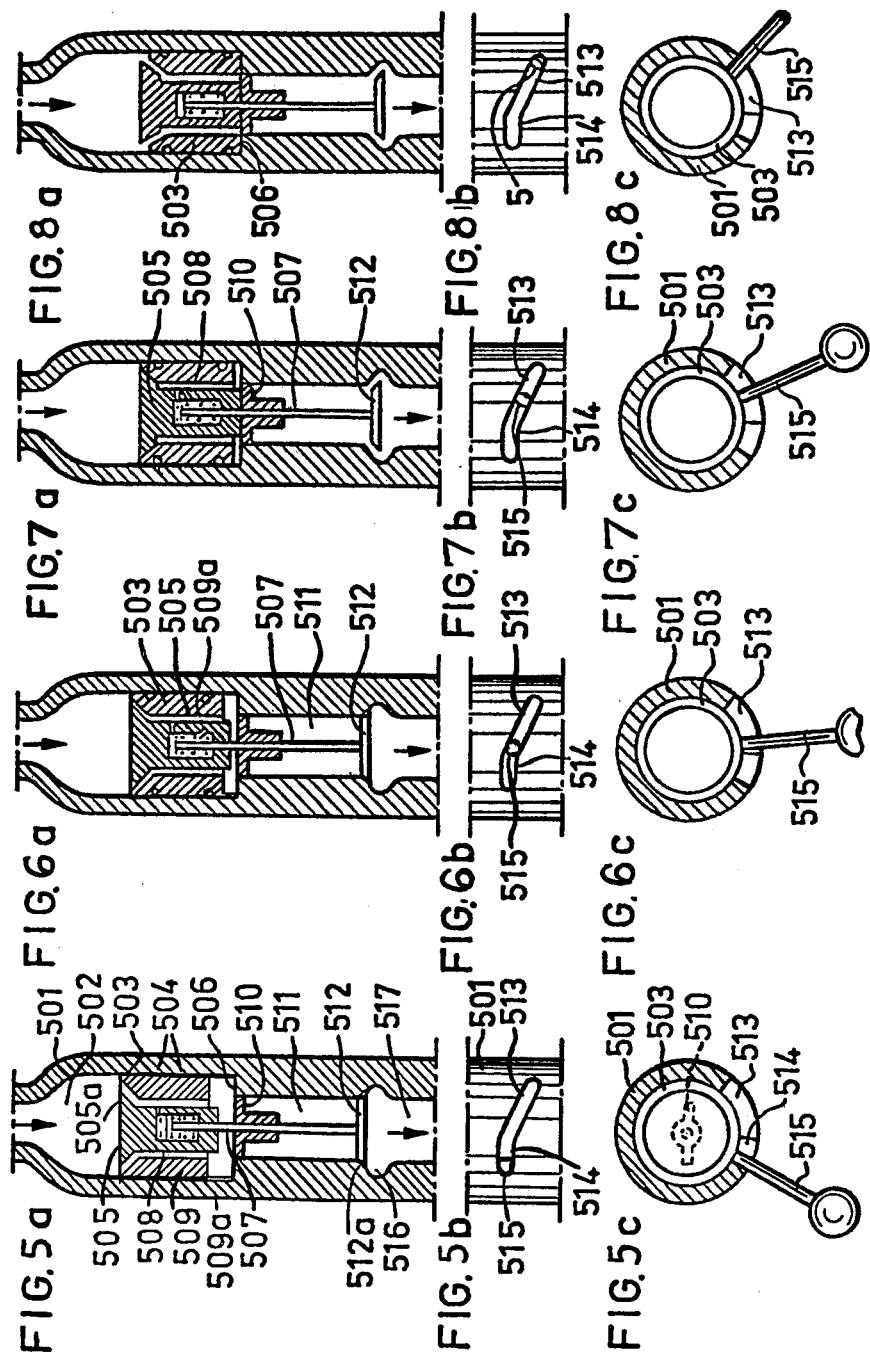

VALVE WITH DRAW BACK AFTER CLOSING

This application is a division of Serial No. 334,559 filed Feb. 22, 1973, now U.S. Pat. No. 3,886,974 of June 3, 1975.

A disadvantage of known valves is that they do not prevent dripping after the supply line has been turned off. Such disadvantages exist in burner valves, in filling taps for fuel, as well as in valves of other kinds. Closely connected therewith is another problem, namely to achieve an effective turning off or throttling of a liquid and to enable an easy opening of the liquid passage at the same time.

THE DRAWINGS

FIGS. 5a,b,c; 6a,b,c; 7a,b,c; and 8a,b,c illustrate a third embodiment of my invention showing the relative movement of some of the parts as the device is changed from a no-flow to a full-flow condition.

THE PRESENT INVENTION

Figure 1:
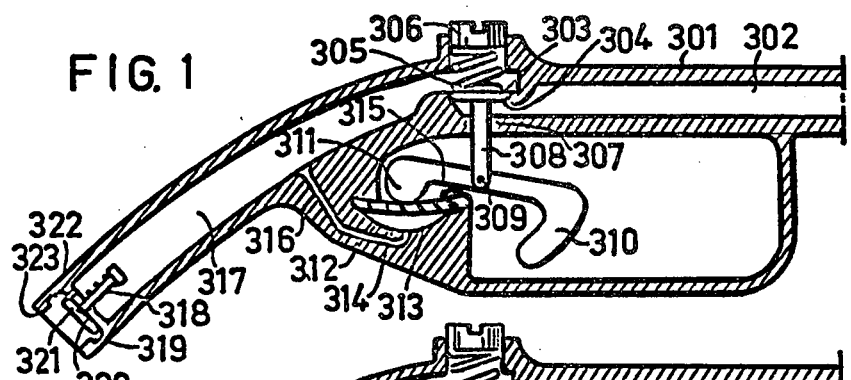
FIGS. 1 – 3 are cross-section views of one embodiment of the invention showing the relative movement of some of the parts as the device is changed from a no-flow to a full-flow position.

In FIG. 1 the valve is closed and the pump is switched on. Present in the valve housing 301, designed as a handle, is a feed line 302, where the liquid acts on a valve disc or the like 303 which seals against a seat 304. A pressure spring 305, the pressure of which is adjustable from the outside by means of a screw 306, holds the disc 303 in position. The disc spindle 308 fits tightly against 301 by virtue of packing 307 and is flexibly connected at 309 to a lever 310, one end of which is designed as a squeezer and the other end 311 of which is provided with an eccentric contour. This contoured end 311 influences a membrane 313, which is provided with a thickened portion 314 for sealing a channel 316 that extends from the outlet 317 to a vacuum chamber 312 underneath the membrane 313. 315 designates a point of support about which the lever 310 is swung upon the opening and closing of the valve disc 303. The outlet mouth is provided with a non-return valve, whose spring 318 closes when a pressure which is less than the pump pressure exists. The non-return valve disc 321 and associated valve spindle are held in position by means of a guide 320 and fit tightly against the seat 319. Arranged in the mouth of the free end of the outlet mouth is a ring cavity 322 with an outer displacement.

Figure 2:
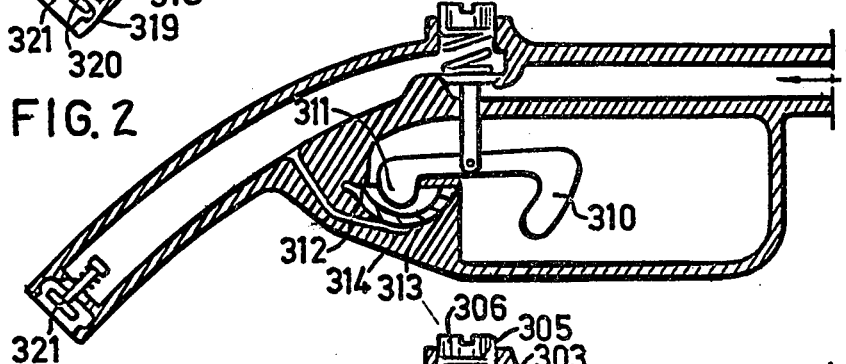

FIG. 2 shows the opening of the valve starting and 310 is lifted half-way, in which position end 311 presses the membrane 313 down and consequently forces liquid via the channel 316 into the outlet 317. The pressure in 317 increases and the non-return valve opens. The spring 305 holds 303 in position, so that no liquid passes therethrough before 314 has blocked the opening to 316.

Figure 3:
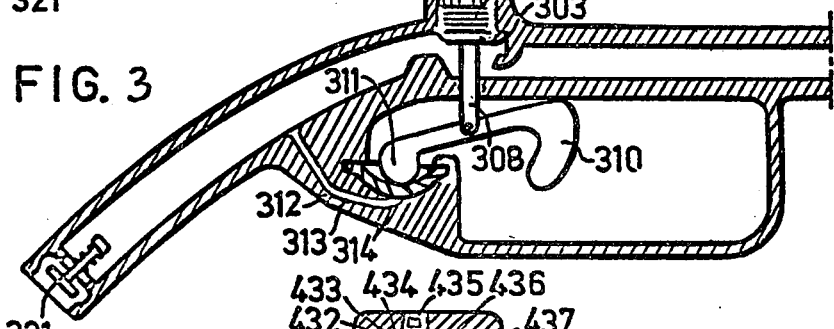

In FIG. 3, 310 is completely raised and the liquid can flow directly from 302 to 317 and outwards, keeping the non-return valve open.

After discharge through the valve is completed to the desired extent, the parts first of all return to the positions shown in FIG. 2. The non-return valve then begins to close at the same time as 313 returns the lever 310 to the starting position shown with FIG. 1, whereby a vacuum arises in 312 and liquid is sucked back via 316 by a suction or vacuum effect. The non-return valve then closes quickly and any liquid left between 303 and 321 remains in either 312, 316 or 317.

In accordance with another embodiment (not shown) the valve body 303, 305 can take care of the return flow. In this connection, a bore acting as a vacuum chamber can be arranged in connection with the seat 304 if a pressure spring presses the body back after discharge is completed.

Figure 4:
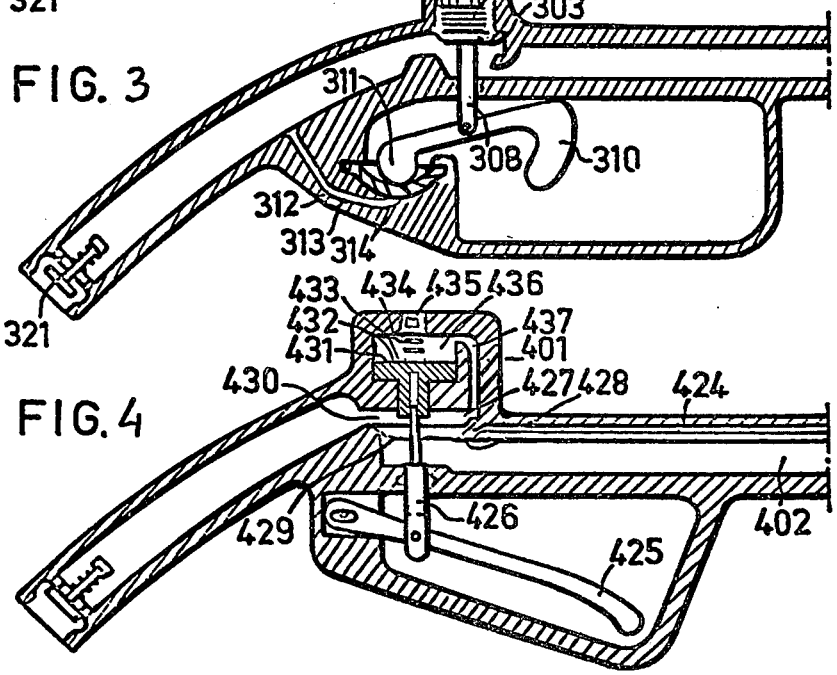
FIG. 4 is a cross-sectional view of another embodiment of the invention in a no-flow condition.

FIG. 4 shows an alternate design which is ready for actuation. The front end of the lever 425 is, for example fastened pivotably in the housing 401. If the rear free lever end is raised halfway, then a rod 426 presses through the spindleless body valve 427 and further upwards against a spring 423 in a spindle bore 433 of a vacuum piston, which is then raised to its upper limit position against the effect of a pressure spring 434, the pressure of which is adjustable by means of a screw 435. In this case, the liquid in the vacuum chamber 436 above the piston 431 is forced out via a channel 437 and the non-return valve arranged on the mouth. Upon complete raising of the lever 425, a shoulder on the rod 426 presses the valve body 427 away from the seat 428 against the action of a pressure spring 430. Arranged in the bore of the valve body 427 is a sealing member 429. The liquid can flow directly from the supply channel to the mouth.

Upon completion of the discharge of liquid from the valve, 430 presses the body 427 onto the seat once more. The non-return valve closes at the same time as the vacuum chamber begins to function, which causes liquid to be sucked back from the outlet via 437. The space underneath the piston 431 can be connected via a channel 424 to the atmosphere.

Non-return valves (not shown) can be arranged in the channels 437 and 424 if the channels are connected together, so that no liquid is forced out through the mouthpiece before 427 has been opened.

The embodiment shown in FIGS. 5 – 8 is especially intended for use with cocks, faucets or taps. Arranged in the valve housing 501 (see FIGS. 5b and 5c) is an oblique groove 513 the upstream end of which ends in a transversely extending slot 514 which acts as a lock. Guided in the groove is a radially outwardly extending lever 515 that has its inner end fastened to an axially displaceable sleeve 503. Sleeve 503 is arranged above a shoulder 506 and beneath an inlet chamber 502. The upper part of sleeve 503 and valve disc 505 can be sealed together at 505a to prevent downward flow from chamber 502. The circumferential sealing surfaces shown at 505a diverge in an upstream direction, so that the fluid pressure from chamber 502 exerts a pressure on disc 505, which in turn exerts a sealing pressure on the seat 505a of sleeve 503. Seal 505a may incorporate a seal, if desired. Valve disc 505 is provided with a central axially extending portion containing a hollow interior space 509 into which a spindle 507 from a lower downstream valve disc 512 extends. Valve disc 512 is designed to fit tightly against a seat 512a constituted by the housing 507 and preferably circumferentially diverging in a downstream direction and with the disc 512 diverging correspondingly. The upper free end of the spindle 507 that extends within said space 509 is provided with a laterally extending collar 508, which in effect acts as a piston. A spring 509a extends below the piston or collar 508 and laterally supported by an inner wall of space 509 normally urges the piston 508 in an upward direction. In the position of the valve shown in FIGS. 5a, b, c spring 509a is somewhat compressed and collar 508 is spaced apart from the upper end wall of the space 509 so as to thus leave what can be considered as a buffer space. The spindle 507 extends through a guideway 510 which also may act as a stop means for lower end of disc 505. 511 is a chamber defined by housing 501 substantially between said shoulder 506 and said seat 512a and acts as a vacuum chamber. Beneath 512a there can be arranged a ring cavity 516, somewhat above the outlet 517, which cavity allows downstream movement of spindle 507 and the disc 512.

For commencement of the flow of liquid, the lever 515 (in accordance with FIGS. 6b and c) is moved to the right (into groove 513 and then obliquely in downstream direction) whereupon 503 and 505 are lowered with respect to shoulder 506 (as indicated in FIG. 6a) which increases the pressure in chamber 511. 505 and 512 are still seated on their respective seats due to expansion and pressure of spring 509a during this move, and the sealing of 505 to 503 is also assisted or improved by the liquid pressure, in 502. Due to the upward force of spring 509a applied against collar 508, valve disc 512 will remain seated against seat 512a during movement of the aforementioned valve parts and in the position corresponding to FIG. 6 where collar 508 rests against the innerwall of said projection 505b. As the lever 515 is lowered further to the position shown in FIG. 7 the downward movement of the lower end of member 505 is stopped by the top of guideway 510. But prior to this, as the top of collar 508 strikes against the upper end of the hollow space 509, spindle 507 is pressed down, so that 512 opens completely before the lower end of 505 has reached 510. As the lever 515 moves further, as shown in FIG. 8, the sleeve 503 is moved downwardly with respect to the lower end of member 505, so that the faucet is now completely open. This last-mentioned lever movement is possible, because the lower end of 505 extends downwardly beyond sleeve 503, and accordingly 503 can be moved downwards a bit after the lower end of 505 has been stopped by 510. As evident from the drawings, there is an annular space between 505 and 505 thus enabling fluid flow between these parts.

When the liquid flow is to be cut off, the reverse sequence of events occurs. For instance, with reference to FIG. 7, when lever 515 raises sleeve 503 it will move toward a closing position with respect to 505. Shortly before it completely closes, the amount of liquid flowing between 505 and 503 becomes less than the volume increase which the bottom of 503 brings about with respect to 511. The out-flow of liquid is thereby abruptly interrupted. In this connection it should be observed, that the diameter of 503 is larger than that of 511, thereby bringing about the aforementioned advantage. In the position in accordance with FIG. 6 the entire head of liquid is raised and 512 begins to press tightly against 512a. Upon the further raising of 503 (by lever 515) into the position shown in FIG. 5, a reduced pressure occurs in chamber 511 and the pressure of the spring 509a increases the abutment of 505 and 512 against the relevant seats. The entire faucet is now tight, and at the same time, is protected by the vacuum part, thus preventing subsequent dripping.

The faucet can also be provided with a rotatable spindle instead of a lever. The faucet can also be used for the injecting of fluid, for example in the case of pressure vessels. 512 can, in this connection, be calibrated in such a way that the pressure at 517 becomes greater than 505. The inverse ratio only applies after 515 has assumed a position in accordance with FIG. 7.

What I claim is:

1. A valve device for a fluid line comprising
   a valve chamber,
   a fluid inlet to said valve chamber,
   a fluid outlet from said valve chamber, said outlet being provided with a non-return valve and an outer ring cavity,
   a pressure chamber which includes a movable barrier member that functions as a piston,
   a channel connecting one side of said pressure chamber with the main fluid passageway between said inlet and outlet,
   a valve body positioned between said inlet and outlet,
   a pressure spring acting upon one side of valve body,
   a spindle linked to the other side of said valve body,
   a lever means having one end that is designed as a squeezer, having the other end designed to periodically influence the movable barrier member in said piston chamber under the influence of manual pressure, and having an intermediate portion between said ends that it attached to said spindle,
   whereby when said squeezer end of said lever means is moved so as to cause said valve body to close to cut off fluid flow between said inlet and outlet, the other end of said lever means will cause said barrier member to move so as to create a reduced pressure in said pressure chamber, which in turn will cause a fluid between said fluid outlet and valve body to be sucked up into said channel that connects one side of said pressure chamber with the fluid passageway between said inlet and outlet.

2. A valve device for a fluid line comprising
   a valve chamber,
   a fluid inlet to said valve chamber,
   a fluid outlet from said valve chamber,
   a non-return valve adjacent the end of said outlet,
   a vacuum chamber which includes a piston member that is biased in one direction by a spring member,
   a channel connecting one side of said vacuum chamber with the main fluid passageway between said inlet and outlet,
   a valve body positioned between said inlet and outlet,
   a pressure spring pressing against one side of valve body,
   a rod extending through said valve body, the portion of the rod that is on the side of the valve that is opposite to the side against which the pressure spring presses being provided with a shoulder,
   a lever means attached to the end of said rod that carries the shoulder, said lever means being pivotally mounted so that manual manipulation thereof will cause said shoulder means to be pushed against said valve body so as to open said valve,
   the end of said rod that is on the same side of the valve body as said pressure spring forming the spindle of said piston member, whereby when said lever means is moved so as to cause said valve body to close to cut off fluid flow between said inlet and outlet, said piston member will move so as to create a reduced pressure in said vacuum chamber, which in turn will cause a fluid to be sucked up into said channel.

3. A valve device for a fluid line comprising in combination:
   a. two spaced apart valve members and a main fluid passageway extending between said valve members, said valve members including an upstream valve member and a downstream valve member, b. a variable pressure chamber having a piston member, c. a secondary fluid passageway having one end opening into said main fluid passageway between said spaced apart valve members and the other end opening into one side of said variable pressure chamber, d. means for mechanically opening and closing said upstream valve member, and e. means responsive to the closing of said upstream valve member to generate a reduced pressure in the side of said variable pressure chamber into which said secondary fluid passageway opens, whereby when the upstream valve member is closed the reduced pressure in said variable pressure chamber will suck liquid from said main fluid passageway up into said secondary fluid passageway.

4. A valve device according to claim 3 which includes stop means positioned within said valve device to limit the axial movement of said second valve so that there will be a fluid flow space between the exterior of said second valve and the interior of said axially moveable seat during one portion of the time that said lever means moves said axially moveable sleeve.

5. A valve device for a fluid line comprising
a valve chamber,
a fluid inlet to said valve chamber,
a fluid outlet from said valve chamber,
a first valve adjacent said fluid outlet and a second valve adjacent said fluid inlet, said valves being located at spaced apart points along the axis of said valve chamber,
a space within said second valve member,
a spindle interconnecting said first and second valves,
one end of said spindle being fixedly attached to said first valve,
the other end of said spindle slideably extending into said space within said second valve,
a pressure spring within said space of said second valve, said spring engaging said other end of said spindle so as to pull said first and second valves toward each other under the pressure of said spring,
a fixed seat in said chamber located adjacent said fluid outlet for seating said first valve,
an axially movable seat adjacent said fluid inlet for seating said second valve, and
lever means for moving said axially movable sleeve-like seat within said valve chamber so as to alternately seat and unseat said second valve member,
whereby when said lever means is moved so as to cause said second valve to seat against said axially moveable seat to cut off fluid flow through said fluid inlet, and such movement is continued to an extent that the second valve is moved axially away from said first valve, the interior of said valve chamber between said first and second valves will act as a reduced pressure chamber and cause fluid in the vicinity of said first valve to be sucked up into said reduced pressure chamber.

6. A valve device as set forth in claim 5 characterized in that the axially moveable seat is in the form of a sleeve which cooperates with a housing shoulder on the interior of the valve chamber and said lever means extends through the wall of said valve chamber so that it can be moved manually from a point outside said valve chamber.

* * * * *